E. E. KING.
ROTARY AIR VALVE FOR CORNETS OR THE LIKE.
APPLICATION FILED AUG. 19, 1916.
1,244,745.
Patented Oct. 30, 1917.
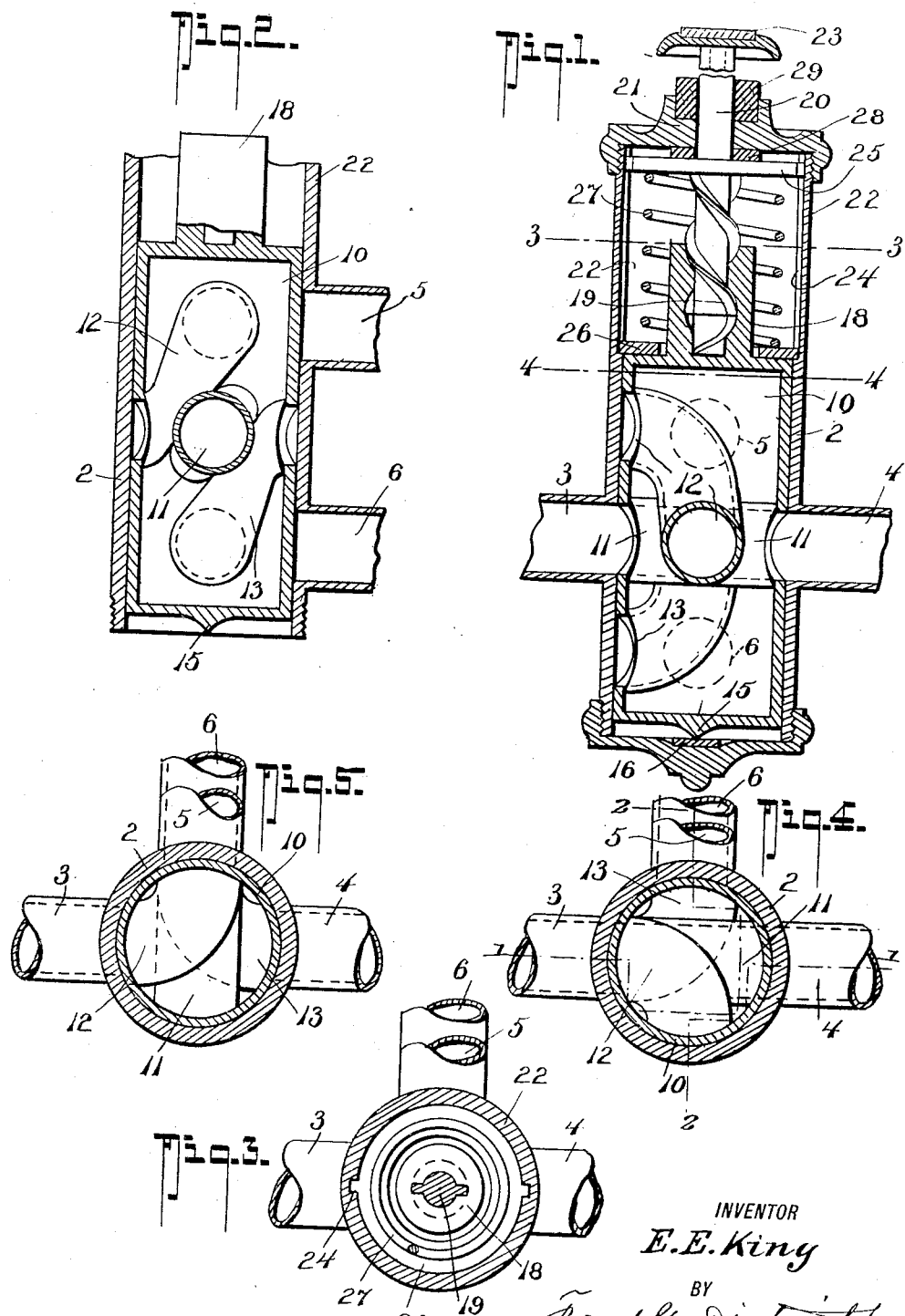
INVENTOR
E. E. King
BY
Fred G. Dieterich
ATTORNEYS.

UNITED STATES PATENT OFFICE.

EUGENE E. KING, OF VANCOUVER, BRITISH COLUMBIA, CANADA.

ROTARY AIR-VALVE FOR CORNETS OR THE LIKE.

1,244,745.  Specification of Letters Patent.  Patented Oct. 30, 1917.

Application filed August 19, 1916. Serial No. 115,870.

*To all whom it may concern:*

Be it known that I, EUGENE E. KING, a citizen of the Dominion of Canada, residing at Vancouver, in the Province of British Columbia, Canada, have invented certain new and useful Improvements in Rotary Air-Valves for Cornets or the like, of which the following is a specification.

This invention relates to a rotary air valve mechanism to control the admission of air through the slide tubes of a wind instrument, such as a cornet or the like, and the invention comprises the construction of the valve mechanism whereby a minimum of frictional resistance is offered to its rotation and to the means whereby that rotation is effected.

The invention is particularly described in the following specification, reference being made to the drawings by which it is accompanied, in which:

Figure 1 is a vertical section through the valve mechanism and its casing in the plane of the mouthpiece and bell connection thereto, the tubular connections of the hollow valve being in elevation, the section being taken substantially on the line 1—1 on Fig. 4, the valve mechanism being in the position to close off connection with the slide and open the passage directly from the mouth piece to the bell.

Fig. 2 is a similar section of the valve mechanism and a part of the casing in the plane of the slide connection, the section being taken substantially on the line 2—2 on Fig. 4.

Fig. 3 is a cross section on the line 3—3 in Fig. 1.

Fig. 4, a cross section on the line 4—4 in Fig. 1, and

Fig. 5 is a cross section on the same plane 4—4, the valve being turned to connect the slide between the mouthpiece and bell connections.

In these drawings 2 represents the cylindrical casing within which is the valve, 3 the tubular connection to that casing from the mouthpiece of the instrument and 4 the tubular connection to the bell of the instrument, 3 and 4 being diametrically opposite and in axial alinement with one another.

The tubular connections to and from the slide which this particular valve mechanism is designed to connect in the instrument, are represented by 5 and 6, both of which are on the same side of the valve casing 2, one on each side of the axis of 3 and 4 and angularly quartered therewith.

The hollow cylindrical valve 10 is freely rotatable but not endwise movable within the casing 2. The ends of it are closed, and the valve is provided with three tubular air ducts 11, 12 and 13, one of which 11 passes diametrically through the valve and its axis is in the same transverse plane as the axis of the mouthpiece and bell connections 3 and 4 of the casing, so that it may be placed in alinement therewith. One end of the duct 12 lies in the same transverse plane as the axis of the duct 11. The other end of the duct 12 lies above the axis of the duct 11 but in vertical alinement with the axis of the duct 11. One end of the duct 13 lies in the same transverse plane as the axis of the duct 11 but on the side opposite to that at which the duct 12 has its termination. The other end of the duct 13 lies below the duct 11 and has its opening in the same vertical plane as that containing the axis of the duct 11, so that the ducts 11, 12 and 13 each have an opening at the same side of the vertical axis of the valve and in vertical alinement and so that the ducts 12 and 13 also have an opening in transverse alinement and at opposite sides of the duct 11 and diametrically opposite one another.

The valve 10 so ported may be turned so that the duct 11 registers with the tubular connections 3 and 4 of the casing, as shown in Figs. 1 and 4 of the drawing, in which case the slide 5, 6 is cut off from communication, as the ends of the ducts 12, 13, which are in the same transverse plane as 11, are quartered therewith; and the ends, which are in the same axial plane as 11, are located in different transverse planes, that is, in the transverse planes of 5 and 6 respectively.

If the valve is rotated through a quarter of a revolution toward the side in which are the slide ducts 5 and 6, the duct 11 is cut off from communication with 3 and 4 and the ends of the ducts 12 and 13, which are in the same transverse plane as the duct 11 will register with 3 and 4 respectively, and the ends of the same ducts, which are in the transverse plane of the slide connections 5 and 6, register respectively with these, so that the air from the mouthpiece is diverted through the slide 5, 6 before delivery through the connection 4 to the bell.

As stated the valve 10 is free to rotate but has no endwise movement. To minimize friction the lower end has a conical point 15 which bears upon a plane 16 in the end cap of the valve casing, and at the opposite end a washer plate 26 fitting a cylindrical extension 22 of the valve casing 2 prevents movement upward. A nut 18 is secured on the upper end of the valve and is threaded to receive a quick pitch double screw thread 19 on the end of a plunger stem 20 which passes through the upper cap 21 of the valve casing extension 22 and outside the cap has a finger-engaging button or finger key 23. The plunger stem 20 has a washer 25 rigidly secured to it, which washer has projections which fit lengthwise grooves 24 on the casing extension 22. The plunger 20 being thus prevented rotating, its screw threads 19 rotate the nut 18 and the valve 10.

A spring 27 is interposed between the washers 25 and 26, which spring retains the plunger at the upper limit of its movement which is its normal position with the duct 11 of the valve directly connecting the mouthpiece connection 3 with the bell connection 4, but if the plunger is moved down the valve is rotated through a quarter revolution to connect, in the manner previously described, the tubular slide 5 6 between the mouthpiece and bell connection 3 and 4. Cork washers 28 and 29 limit the endwise movement of the plunger stem and deaden the impact at those limits.

In the drawing the tubular ducts 11, 12 and 13 are shown as slightly flattened where they interfere with one another adjacent the middle of the valve, but such is largely due to the sensible thickness which is necessary to give the walls of these ducts in the drawing. In practice these ducts are made from very thin metal and will interfere but slightly, if care is taken in arranging them.

The advantage of the construction of this valve and its operating mechanism will be apparent to one familiar with the instruments to which it is applicable, as the valve 10 being very light and rotatable with a minimum of friction, may be rotated readily by a screw having a relatively fine pitch, say three-quarters of an inch, so that as the valve only requires to be rotated through a quarter of a revolution, the endwise movement of the plunger on the end of which the screw thread is formed need not exceed three-sixteenths of an inch, which will be distinctly advantageous where quick fingering is required.

Having now particularly described my invention, I hereby declare that what I claim as new and desire to be protected in by Letters Patent, is:

1. A cornet having a mouth piece, a bell, a slide, and a valve casing to diametrically opposite sides of which casing the mouth piece and bell are connected and to one side of which the pipes to and from the slide are connected in different transverse planes, a valve rotatable without endwise movement in said casing, said valve having a straight duct that will directly connect the mouth piece to the bell, and two other ducts that when the valve is rotated to close communication through the straight duct will connect respectively the mouth piece connection of the casing to one of the slide connections thereof and the other slide connection to the bell connection, and means for rotating said valve.

2. A cornet having a mouth piece, a bell, a slide, and a valve casing to diametrically opposite sides of which casing the mouth piece and bell are connected and to one side of which the pipes to and from the slide are connected in different transverse planes, a cylindrical valve rotatably mounted without endwise movement in the casing, said valve having a duct diametrically through it in the same transverse plane as the mouth piece and bell connections to the casing, that it may be placed in alinement therewith, and two other ducts one end of each of which is in the same transverse plane as the first mentioned duct but quartered therewith to opposite sides of the valve and the other end of each of which is on the same side as the mouth piece connection but in different transverse planes, and means for rotating the valve.

3. A cornet having a mouth piece, a bell, a slide, and a valve casing to diametrically opposite sides of which casing the mouth piece and bell are connected and to one side of which the pipes to and from the slide are connected in different transverse planes, said casing having ports for connection with the mouth piece and bell and with the slide pipes, a hollow cylindrical valve rotatable within said casing, means holding said valve against endwise movement, said valve having a duct tube that will directly connect the mouth piece and the bell, said valve having two other duct tubes that when the valve is rotated to close communication through the straight duct tube, will connect respectively the mouth piece connection of the casing to one of the slide connections thereof and the other slide connection to the bell connection, and means for rotating said valve.

4. A valve mechanism for wind instruments which comprises a tubular valve casing having a pair of vertical alining ports on the same side adapted to communicate with the slide of the wind instrument and having a pair of opposing diametrically opposite ports in a transverse plane between the first mentioned ports and at right angles thereto, said last named ports adapted to connect respectively with the mouth piece and with the bell of the wind instrument, a valve rotatable within said casing for controlling the aforesaid ports, said valve having a bearing pin at its bottom, a bearing element carried by said valve casing with which said pin engages, a spring-pressed device for holding said valve with its bearing pin in bearing engagement with said casing-carried bearing element, an operating finger piece projected into said valve casing and having a screw and nut connection with said valve for rotating the same, all being arranged substantially as shown and described.

5. A valve mechanism for wind instruments which comprises a tubular valve casing having a pair of vertical alining ports on the same side adapted to communicate with the slide of the wind instrument and having a pair of opposing diametrically opposite ports in a transverse plane between the first mentioned ports and at right angles thereto, said last named ports adapted to connect respectively with the mouth piece and with the bell of the wind instrument, a valve rotatable within said casing for controlling the aforesaid ports, said valve having a bearing pin at its bottom, a bearing element carried by said valve casing with which said pin engages, a spring pressed device for holding said valve with its bearing pin in bearing engagement with said casing carried bearing element, an operating finger piece projected into said valve casing and having a screw and nut connection with said valve for rotating the same, said valve comprising a hollow cylindrical body having ports for registering with the respective valve casing ports and duct tubes connecting coöperating pairs of valve ports, said duct tubes being located within said hollow valve, all being arranged substantially as shown and described.

6. A valve mechanism for connecting the slide of a cornet or the like wind instrument, said valve mechanism comprising the combination with a hollow cylindrical casing to which the tubes from the mouthpiece and to the bell are connected at diametrically opposite sides and to one of the sides of which casing connection is made to and from the slide it is desired to control, of a valve rotatably fitting the casing, said valve having a duct directly connecting the mouthpiece to the bell, and ducts connecting the same respectively to each of the slide connections when the valve is rotated through an angular distance sufficient to cut off the direct connection from mouthpiece to bell, means for rotating the valve, said means comprising a finger key the stem of which is endwise movable through the end of the valve casing being produced, said stem having at its inner end, a quick pitch thread, a nut secured on the end of the valve with which said quick pitch thread engages, means preventing rotation of the stem, means limiting the endwise movement of the same, and means for returning the finger key to its normal position.

7. A valve mechanism for connecting the slide of a cornet or the like wind instrument, said valve mechanism comprising the combination with a hollow cylindrical casing to which the mouthpiece and bell of the instrument are connected and to one of the sides of which intermediate of the foregoing the slide tubes are connected, a valve rotatably fitting the casing, said valve having ducts that in the normal position of the valve will directly connect the mouthpiece to the bell and that when moved through an angular distance sufficient to cut off the bell from direct communication with the mouthpiece will connect the mouthpiece to the bell through the slide, said valve having a conical point at one end of its axis of rotation, which point bears against one end cap of the casing, means for rotating the valve by endwise pressure applied to the key in axial alinement with the valve, means for limiting the endwise movement of the finger key, and resilient means for returning the valve to its normal position.

In testimony whereof I affix my signature.

EUGENE E. KING.

Copies of this patent may be obtained for five cents each, by addressing the "Commissioner of Patents, Washington, D. C."